(12) United States Patent
Hanish et al.

(10) Patent No.: US 6,257,502 B1
(45) Date of Patent: Jul. 10, 2001

(54) MISTING SYSTEMS

(75) Inventors: Barry N. Hanish, Sherman Oaks; Michael Scott Davis, Santa Monica; Ken Bradley Dallara, Acton, all of CA (US)

(73) Assignee: Mist & Cool, LLC, Simi Valley, CA (US)

( * ) Notice: Subject to any disclaimer, the term of this patent is extended or adjusted under 35 U.S.C. 154(b) by 0 days.

(21) Appl. No.: 09/544,870

(22) Filed: Apr. 7, 2000

Related U.S. Application Data

(60) Provisional application No. 60/145,077, filed on Jul. 21, 1999.

(51) Int. Cl.[7] ....................................................... B05B 1/28
(52) U.S. Cl. ........................... 239/290; 239/291; 239/296; 239/78
(58) Field of Search ................................ 239/77, 78, 290, 239/291, 296, 14.2

(56) References Cited

U.S. PATENT DOCUMENTS

| 2,635,920 | * | 4/1953 | Boyce | 239/77 |
|---|---|---|---|---|
| 3,221,993 | * | 12/1965 | Bals | 239/77 |
| 3,296,739 | * | 1/1967 | Wiegel | 239/77 |
| 5,180,106 | * | 1/1993 | Handfield | 239/14.2 |
| 5,961,044 | * | 10/1999 | Dalbec et al. | 239/77 |

* cited by examiner

Primary Examiner—David A. Scherbel
Assistant Examiner—Dinh Q. Nguyen
(74) Attorney, Agent, or Firm—David Weiss

(57) ABSTRACT

An integrated multi-head device for effectively converting liquid into mists directed forwardly and laterally of the device. The device may be used by itself or combined with a fan for efficiently entraining the produced mists in the fan's airstream.

41 Claims, 5 Drawing Sheets

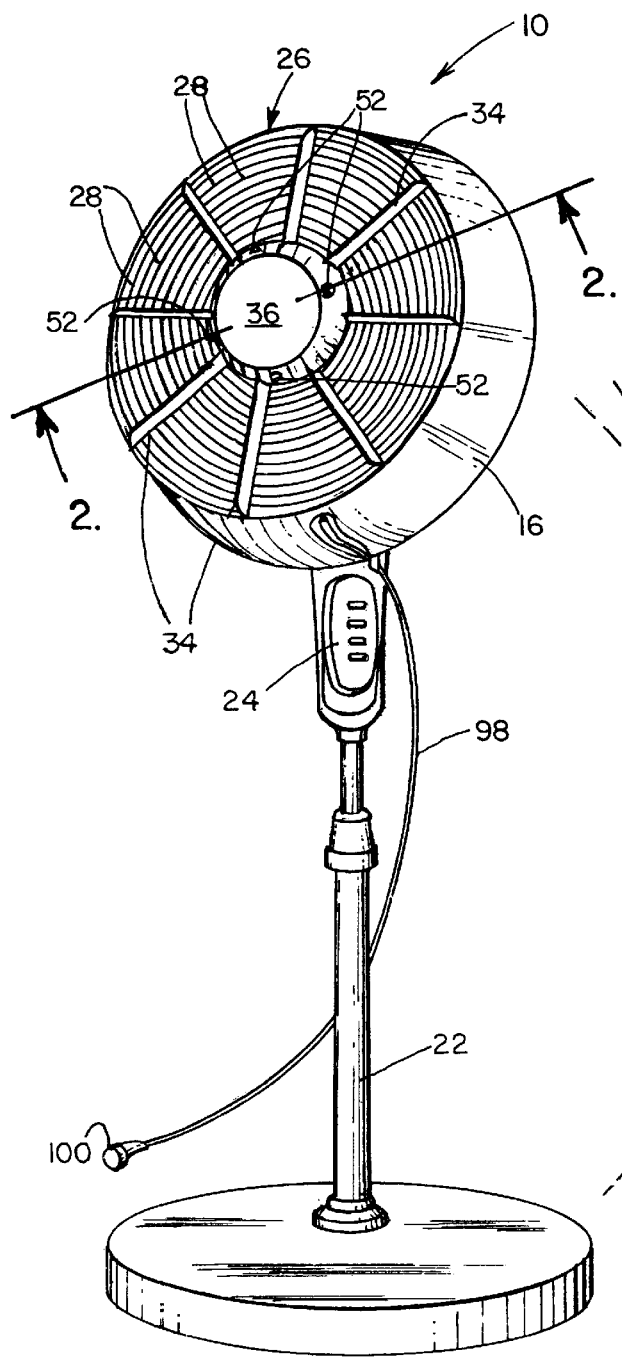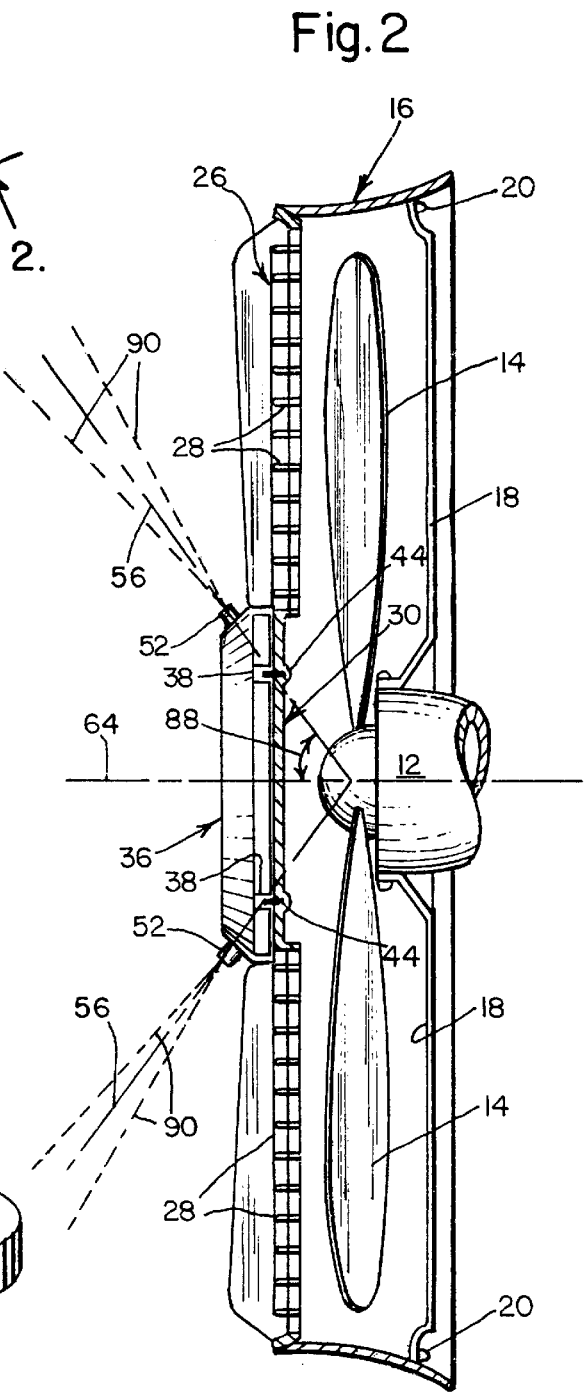
Fig.1
Fig.2

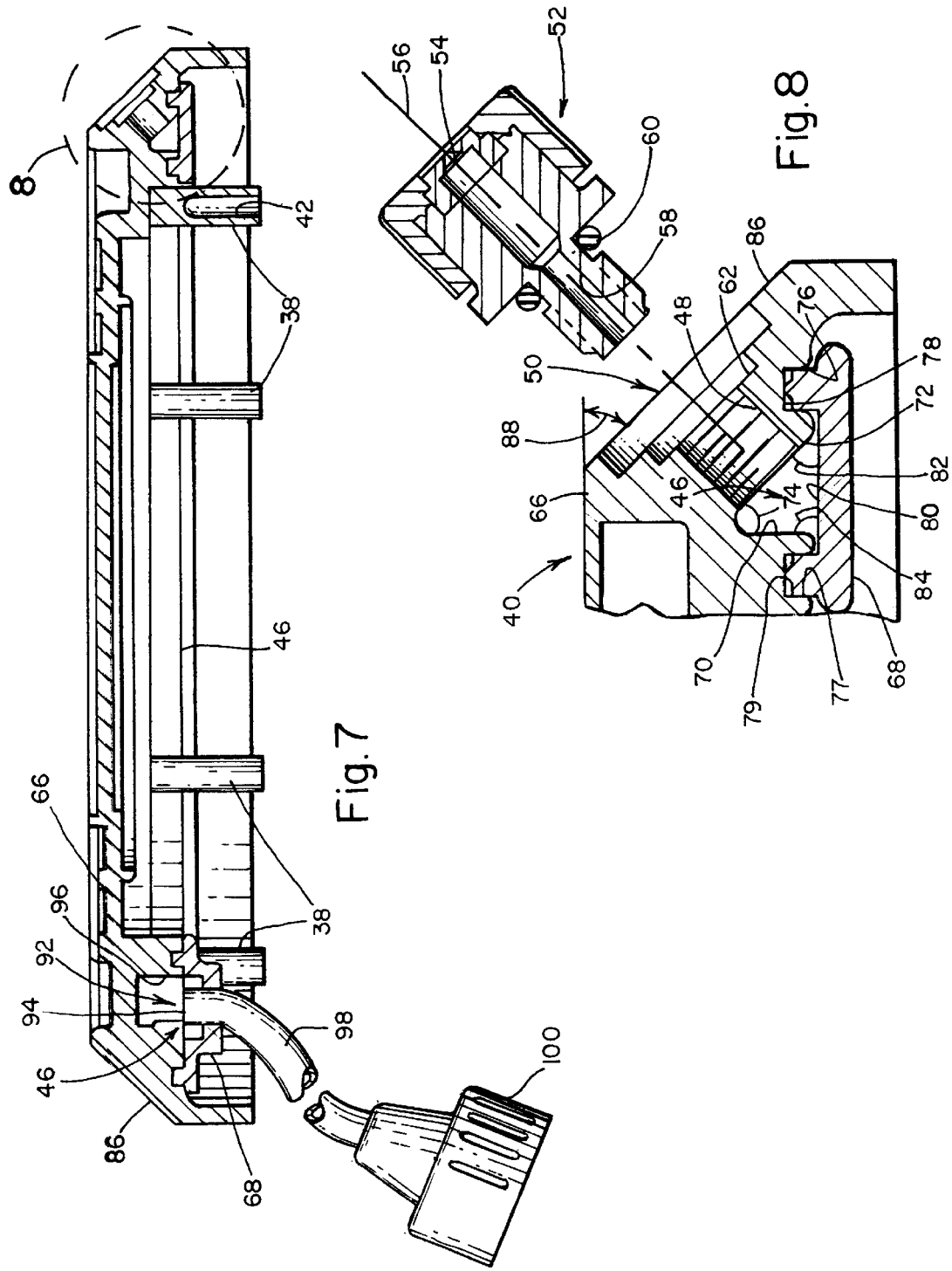

MISTING SYSTEMS

CROSS-REFERENCE TO RELATED APPLICATION

This application claims the benefit of U.S. provisional Application No. 60/145,077, filed Jul. 21, 1999, which application is incorporated herein by reference.

BACKGROUND OF THE INVENTION

Misting systems are of widespread utility, wherever it is desired to effect ultra fine droplets of water or other liquid into a mist or fog. In recent years, misting systems have become quite popular for the cooling effect of misted water on the human body and on animals. Ultra fine water droplets introduced into warm or hot air quickly evaporates, absorbing heat from and thereby cooling the air. Combining mists with moving air may be accomplished by placing a mister in the vicinity of a fan or blower for entraining the mist in the fan's air stream, causing the mist to be distributed to a greater or more directed air volume and at the same time increasing convective cooling. Misting systems, with or without a combined fan, are also useful to humidify air for providing moisture to plants.

SUMMARY OF THE INVENTION

The present invention provides an integrated multi-head misting device that is extremely effective in producing and distributing mists, may be removably attached to a household faucet or garden hose for receiving water to be converted into mists, and is particularly adaptable for being combined with a fan for efficiently entraining the produced mists in the fan's airstream.

According to one aspect of the present invention, a misting fan is provided which comprises the combination of: a fan including a motor and a plurality of fan blades radially extending from the motor; a fan shroud supported with respect to the motor, the shroud including a grille forwardly of the fan blades for permitting an airstream therethrough resulting from the fan when operating, the grille further including a hub forwardly of the motor; and a misting device including a housing secured to the hub, and a plurality of misting heads secured to the housing and arranged for directing spray mists across the grille, and preferably forwardly of the grille. The grille preferably includes a plurality of forwardly projecting fins radially extending from the grille's hub.

The misting device includes a manifold in the housing, the manifold communicating with the heads for distributing liquid under pressure to the heads, and the housing includes an inlet for supplying the liquid to the manifold. The inlet is preferably adapted for receiving water from a household faucet or garden hose, and the misting system is operable with water under normal household pressures although higher water pressures are possible.

In a preferred embodiment for directing the spray mists across the fan grille, the misting heads are secured to the housing along a direction angularly disposed with respect to the direction of the airstream through the grille resulting from the fan when operating; preferably, such direction of the misting heads is approximately 45° with respect to the direction of the airstream. In its preferred embodiment, the housing is substantially circular about a central axis, and the misting heads are arranged about the periphery of the circular housing and at an angle (preferably about 45°) to the central axis so that the spray mists are directed across the grille as well as forwardly of the grille.

The misting device of the present invention is an integrated structure that may be used with or without a fan, and if without a fan the housing of the misting device may be secured to another structure such as a building, a platform or other standing structure. The misting device comprises a housing that is preferably substantially circular about a central axis, and adapted for being secured to a structure; a manifold in the housing for containing pressurized water and including an inlet for receiving water under pressure; a plurality of misting heads spaced along the housing and in communication with the manifold, the misting heads preferably being at an angle to the housing central axis. The manifold is preferably a closed loop channel of right triangular cross-section, with the misting heads communicating with the manifold through an aperture in the manifold's wall including its cross-sectional hypotenuse.

In a preferred misting device structure according to the present invention, the housing includes a body portion and a cover, the body portion including the manifold channel comprising the hypotenuse and one side of the right triangular manifold cross-section and the cover forming the other side, and the cover is sealed to the body which includes the misting heads communicating with the manifold.

One embodiment of the misting device of the present invention includes a plurality of misting-head bases equally spaced along the housing and about the central axis. At least some of the bases are adapted for the misting heads to be secured thereto. When so secured, the misting heads communicate with the manifold for producing the spray mists along a longitudinal axis laterally and forwardly of the housing.

BRIEF DESCRIPTION OF THE DRAWINGS

The novel features believed to be characteristic of the invention, together with further advantages thereof, will be better understood from the following description considered in connection with the accompanying drawings in which preferred embodiments of the invention are illustrated by way of example. It is to be understood, however, that the drawings are for the purpose of illustration and description only and are not intended as a definition of the limits of the invention.

FIG. 1 is a front/side perspective view of a preferred embodiment of a misting fan including a misting device according to the present invention;

FIG. 2 is a side elevation view, part perspective and part cross-sectional, of the misting fan of FIG. 1, taken along the line 2—2 of FIG. 1 in the direction of the appended arrows;

FIG. 7 is a cross-sectional view of the housing of FIGS. 3 and 4 taken along the lines 7—7 in the direction of the appended arrows, shown with an attached water inlet tube;

FIG. 8 is a detail on an enlarged scale taken within the phantom circle 8 in FIG. 7, shown with a misting head in substantial cross-section for being secured to the misting device housing;

DETAILED DESCRIPTION OF THE PREFERRED EMBODIMENTS

Figure 3:
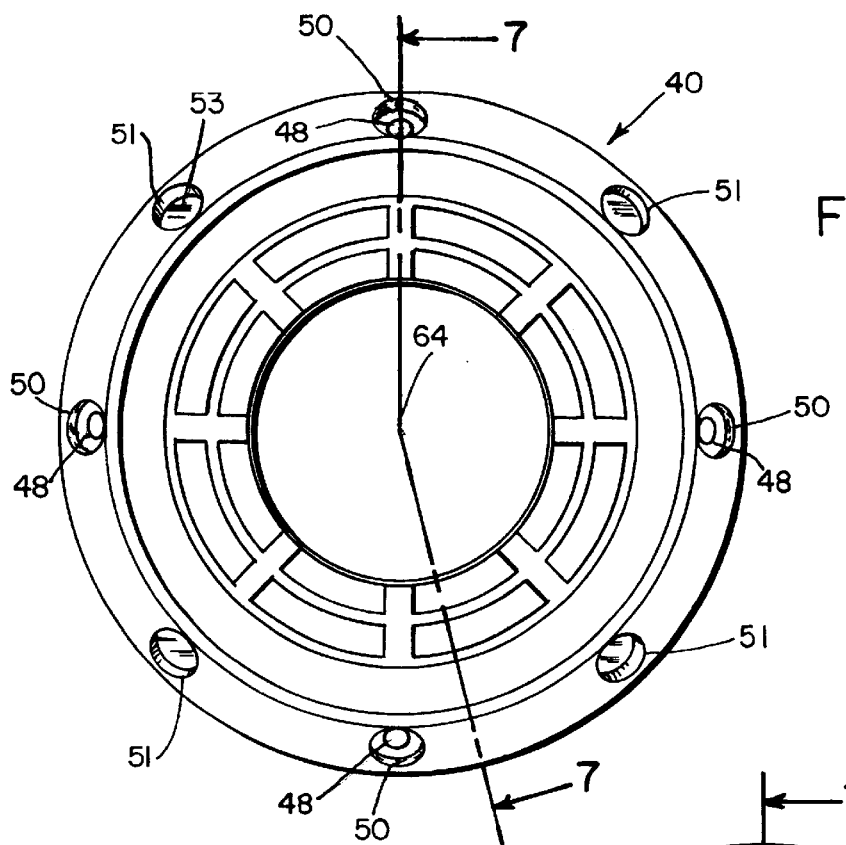
FIG. 3 is a plan view showing the front face of a preferred embodiment of a housing of the misting device shown in FIGS. 1 and 2.
Figure 4:
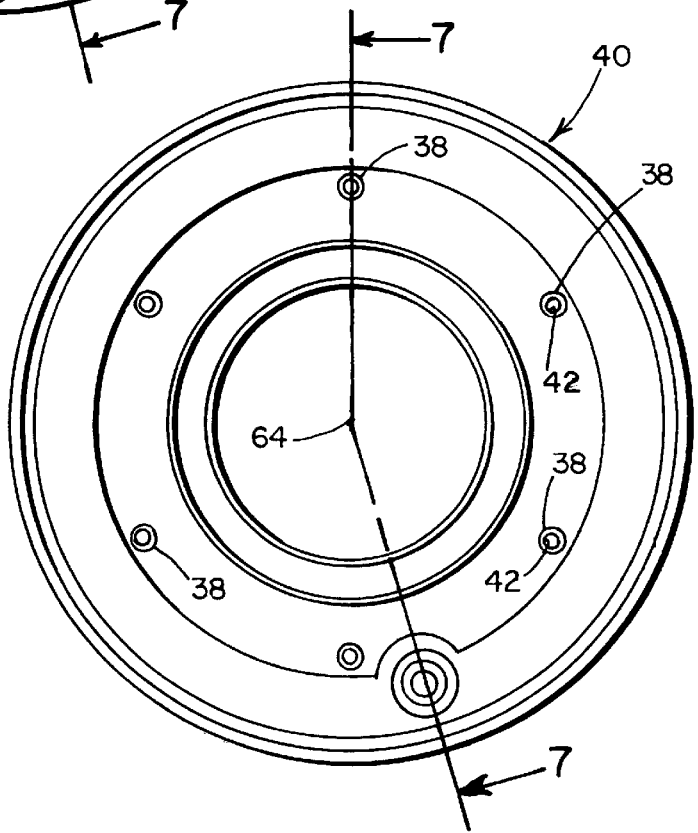
FIG. 4 is a plan view of the rear face of the housing of FIG. 3.
Figure 5:
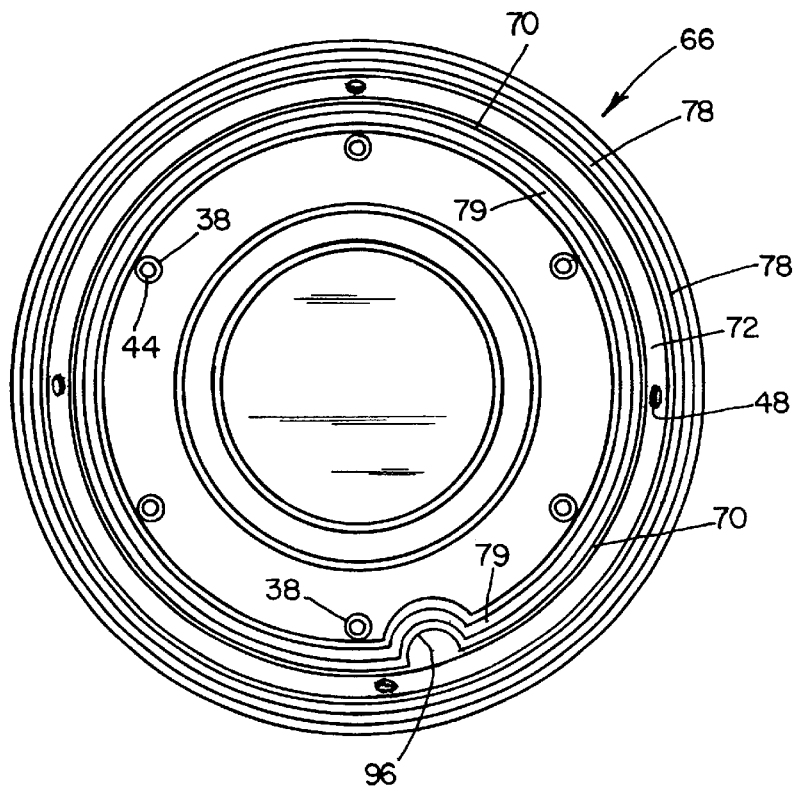
FIG. 5 is a plan view of the rear surface of the body portion of the housing of FIG. 3.
Figure 6:
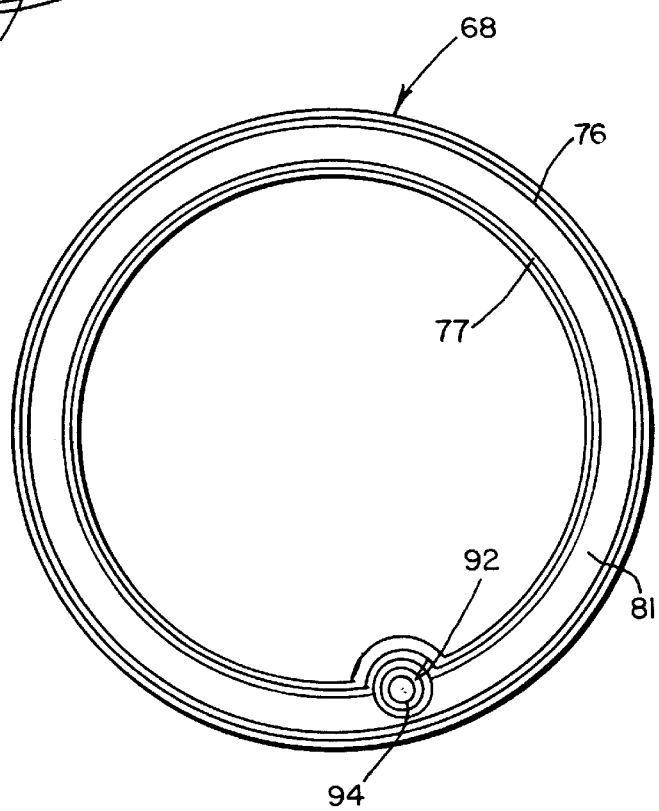
FIG. 6 is a plan view of the inner surface of the cover portion of the housing of FIG. 4.

Turning to FIGS. 1 and 2, there is shown a misting fan 10 including a fan motor 12 having fan blades 14 within a shroud 16. The shroud 16 is supported by rigid attachment wires 18 secured to and radially extending from the fan motor 12 with the outer ends of the wires 18 secured to the periphery of the shroud 16 such as at brackets 20. The fan motor 12 is mounted to a pedestal 22, and is adapted for receiving electric power controlled by switches 24 in conventional manner.

The shroud 16 includes a grille 26 forwardly of the fan blades 14 for permitting an airstream therethrough resulting from the operating fan blades 14. The grille 26 includes radially spaced-apart concentric circular members 28 attached to radial support members 30 secured between the hub 32 and the periphery of the shroud 16. The grille 26 further includes a plurality of forwardly projecting fins 34 secured to the concentric grille members 28 and radially extending from the hub 30 to the periphery of the shroud 16. The presence of the radial fins 34 reduces the tendency of the fan's airstream to spiral or corkscrew, serving to straighten the flow of the airstream forwardly of the grille 26.

Considering FIGS. 3–8 in conjunction with FIGS. 1 and 2, the preferred embodiment of the misting device 36 of the present invention is secured to the hub 30 of the shroud grille 26, such as by mounting posts 38 rearwardly projecting from the rear face of the misting device housing 40. The mounting posts 38 include longitudinal bores 42 (FIGS. 4 and 7) that may be tapped for the reception of screw fasteners 44 extending through corresponding bores in the hub 30 (FIG. 2).

The housing 40 of the misting device 36 includes a manifold 46 for distributing liquid such as water under pressure to a plurality of water outlets, preferably threaded bores 48 through the housing 40 communicating with the manifold 46, spaced about the housing 46 at bases 50 to which misting heads 52 are respectively secured (see, in particular, FIGS. 1, 2, 7 and 8). The misting heads 52 (FIG. 8) are arranged along the outside of the housing 46, as shown in FIGS. 1, 2, 9, 10 and 11 and may be of conventional design, such as distributed by Mist & Cool, LLC, of Simi Valley, Calif., and each includes a misting nozzle 54 along a longitudinal axis 56 and communicating with an axial bore 58 in turn communicating with the manifold 48 when the misting head 52 is threadably secured within a threaded bore 46 of the housing 40. An O-ring 60 is compressively trapped between the misting head 52 and shoulders 62 surrounding the housing bore 48 at each base 50 for assuring against water leakage.

The misting device 36 and its housing 40 are substantially circular about a central axis 64 (FIGS. 1–4). In its preferred embodiment, the housing 40 is fabricated of and includes a body portion 66 and a cover portion 68, secured together to form the manifold 46 (FIGS. 5–8). The body and cover portions 66, 68 are preferably fabricated of a rigid plastic material (for example, an ultraviolet stabilized styrene such as Cycolac ABS produced by General Electric Company), and may be fabricated by conventional processes such as injection molding.

The manifold 46 in its preferred embodiment operates as an energy director for the pressurized liquid contained in the manifold 46, at each of the bases 50, enhancing performance of the misting heads 52 in providing fine mists of high cooling capacity. The body portion 66 includes an annular channel comprising a first wall 70 and a second wall 72 joining the first wall 70 at a first angle 74. The cover 68 includes two spaced concentric projections 76, 77 on either side of a generally flat ring 81 for fitting within two spaced concentric grooves 78, 79 in the body 66, and the cover 68 at projections 76, 77 is secured to the body 66 at grooves 78, 79 by any suitable means, such as by ultrasonic or other plastic welding techniques or by gluing. When the cover 68 is secured to the body 66, a third wall 80 closes the channel formed by the body first and second walls 70, 72, the third wall 80 meeting the second wall 72 at a second angle 82, and the third wall 80 meeting the first wall 70 at a third angle 84, so that the annular channel defining the manifold 46 has a triangular cross-section. In the preferred embodiment of the housing 40, the manifold's first wall 70 is parallel to and concentric about the housing's central axis 64, with the manifold's third wall 80 defining a flat ring perpendicular to and with edges concentric about the housing central axis 64. The second wall 72 defines a conic surface concentric about the housing central axis 64 with the bores 48 of each base 50 extending through the second wall 72. In the example of the preferred embodiment of the housing 40 shown, the cross-section of the manifold 46 substantially defines a right triangle with its third angle 84 being a right angle opposite the threaded aperture 48, and the longitudinal axis 56 of the threaded aperture 48 is preferably perpendicular to the second wall 72 which is the hypotenuse of the manifold's right triangular cross-section, preferably, the first and third angles 74, 82 of the triangular cross-section of the manifold 46 are substantially alike, i.e. these angles may be approximately 45°.

The misting head bases 50 are positioned along an inclined peripheral surface of the circular housing 40, and are equally spaced along a circle concentric about the housing central axis 64. The inclination of the inclined or conic peripheral surface 86 is perpendicular to the longitudinal axis 56 of the base apertures 48, such that the longitudinal axis 56 of the installed misting heads 52 will be at an inclination angle 88 outwardly (i.e. laterally or radially) of the housing central axis 64. Such orientation of the misting heads 52 produces spray mists directed outwardly of the housing central axis 64 as well as forwardly of the housing 40. The relative extent of the forward and lateral (outward) components are determined by the magnitude of the angle of inclination 88; the greater the angle 88 (up to 90°), the greater will be the lateral component of the direction of the spray mists. In the preferred embodiment, the inclination angle 88 is approximately 45°.

A principal advantage of the misting device 36 of the present invention is its capability for producing lateral components to direction of the spray mists created. When the misting device 36 is used by itself, the lateral component effects a wider misting or cooling volume. When the misting device 36 is used in combination with a fan, as shown in FIGS. 1 and 2, the lateral component in the spray mist direction causes the spray mists 90 to be directed across the shroud grille 26, as well as forwardly of the shroud grille 26, causing more thorough and uniform mixing as the mists are entrained with the forwardly moving airstream produced upon rotational operation of the fan blades 14. (The direction of the spray mists 90 are represented in FIG. 1 with the fan blades 14 stationary.)

The housing 40 includes an inlet 92 (see FIGS. 6 and 7), communicating with the manifold 46 for supplying liquid or water under pressure thereto. The inlet 92 may include an aperture 94 through the cover 68 communicating with an inlet chamber 96 in the housing body 66 in turn communicating with the manifold 46. The closed-loop provided by the manifold 46 with the water inlet 92, 96 helps pressure equalization of the water at the misting heads 52. A flexible tube 98 (e.g. of polyethylene) has one end secured to the inlet 92; a connector 100 is attached to the other end of the flexible tube 98, adapted for being connected to a water faucet or garden hose communicating with a source of water under normal household pressure, while the preferred range of use is between 40 and 200 pounds per square inch.

The preferred embodiment of the misting device 36 includes four misting heads 52 respectively secured to four bases 50 equally spaced along the housing's peripheral wall 86 (i.e. at 90° intervals). The housing 40 may further include additional misting head bases 51 (see FIG. 3), such as the four additional bases 51 respectively equally spaced along the housing's peripheral wall 86 and midway between adjacent bases 50. The additional bases 51 may be left inactive and reserved for possible subsequent activation for potential reception of further misting heads 52 in communication with the manifold 46. The additional bases 51 may be rendered inactive by omitting the threaded bores 48 therefrom as in the active bases 50, such inactive bases 51 instead having respective closed bottoms 53 (FIG. 3), to be selectively opened or provided with threaded bores 48 for the reception of further misting heads 52. Alternatively, the inactive bases 51 may include internally threaded bores 48 (i.e., the inactive misting head bases 51 and the active misting head bases 50 may be identical) but closed with plugs (not shown, but similar to the misting heads 52 but including a plug instead of a misting nozzle 54) effectively providing closed bottoms at 53. Such plugs may be replaced by further misting heads 52 as desired to activate the bases 51.

Figure 9:
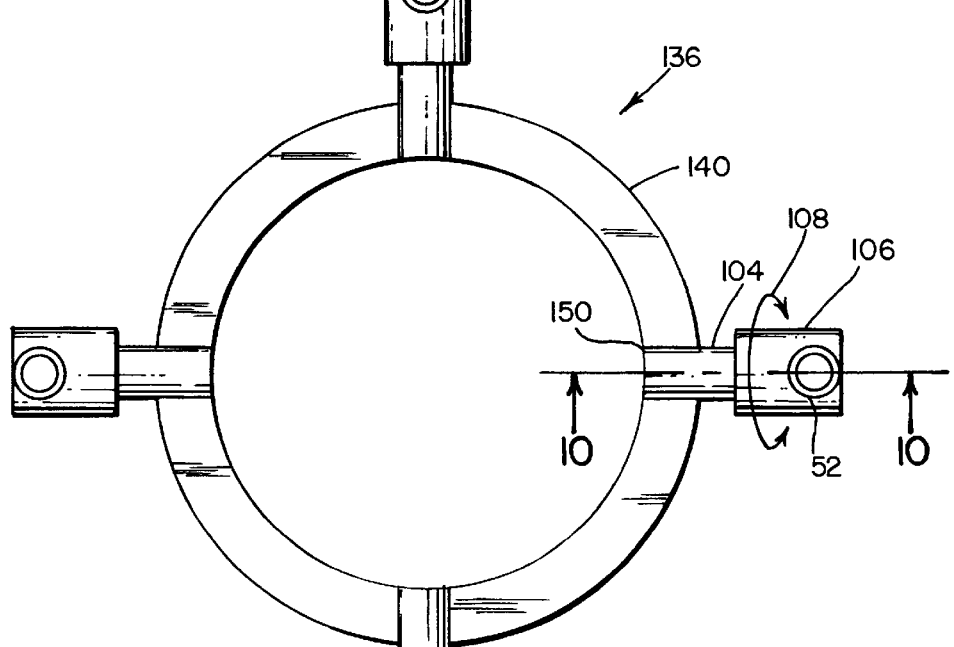
FIG. 9 is a plan view of the front face of a second embodiment of a misting device in accordance with the present invention.
Figure 10:
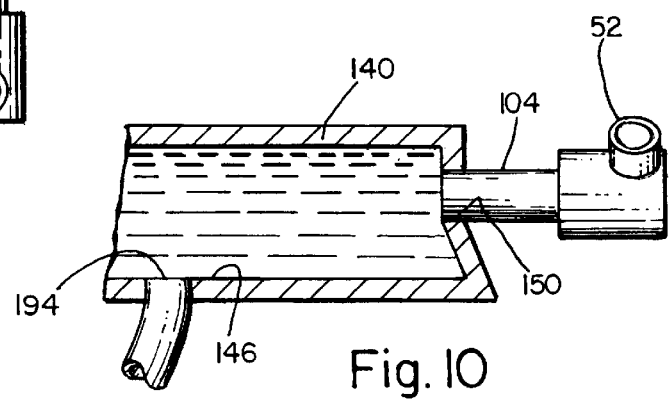
FIG. 10 is a part cross-sectional, part perspective view of the misting device of FIG. 9, taken along the line 10—10 in the direction of the appended arrows except for rotation of a misting head.

An alternative embodiment of a misting device 136 according to the present invention, shown in FIGS. 9 and 10, includes a housing 140 containing a manifold 146. Although the manifold 146 may be similar to the previously described channel manifold 46, FIG. 10 shows another type of manifold within the scope of the present invention comprising a chamber for the liquid between the water inlet 194 and the misting heads 52. The misting heads 52 respectively communicate with liquid supply tube 104 connected to an elbow structure 106 into which a misting head 52 is threaded. The tube 104 may be also be threaded into the housing 140 at a misting head base 150, or connected thereto in another manner. The elbows 106 are preferably rotatable, as indicated by the arrows 108, for rotating the misting heads 52 so that the spray mists are directed along an angle outwardly of the central axis of the housing 140 (i.e. laterally of the housing) as well as forwardly of the housing 140.

Figure 11:
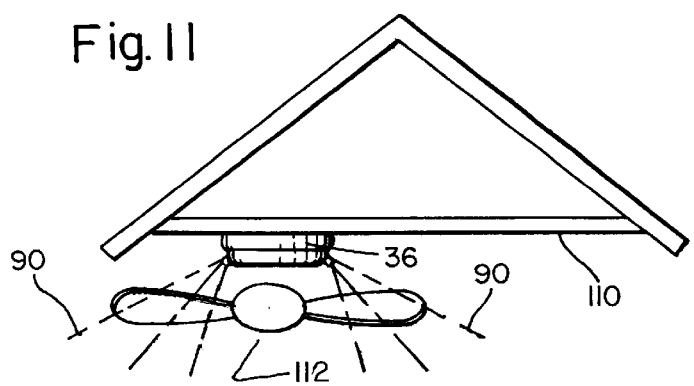
FIG. 11 is a diagrammatic view of a misting device according to the present invention attached to a building structure.

Misting apparatus according to embodiments of the present invention may be mounted on building structures of various types, such as walls, patio covers, and stable interiors, to name but a few examples. FIG. 11 shows a misting device 36 attached to a rafter of a stable or other building structure 110. If desired, the misting device 36 may be mounted forwardly of a ceiling fan, for example by providing the ceiling fan with a grille and attaching the misting device 36 to the grille in the manner that the misting device 36 is secured to the fan 10 shown in FIGS. 1 and 2. Alternatively, if desired, a fan 112 (preferably having a sealed motor) may be mounted forwardly of the misting device 36, as represented in FIG. 11, for drawing the laterally and forwardly (i.e. downwardly in the case of a ceiling fan) directed spray mists 90 into the airstream created by the fan 110 when operating and entraining the mists in the forwardly (or downwardly) directed airstream.

Thus, there has been described misting apparatus that may be attached to a household faucet or garden hose for receiving water to be converted into mists, and that is extremely effective in distributing such mists. In particular, a misting fan has been described that includes the misting device of the present invention, and which efficiently entrains the produced mists into the fan's forward airstream. Other embodiments and configurations of the apparatus of the present invention may be developed without departing from the essential characteristics thereof. Accordingly, the invention should be limited only by the scope of the claims listed below.

We claim:

1. A misting fan comprising the combination of:
    a fan including a motor and a plurality of fan blades radially extending from said motor;
    a fan shroud supported with respect to said motor, said shroud including a grille forwardly of said fan blades for permitting an airstream therethrough resulting from said fan when operating, said grille further including a hub forwardly of said motor; and
    a misting device including a housing secured to said hub, said housing including
        a manifold for pressurized liquid including an inlet for the liquid,
        a plurality of spaced misting head bases, and
        a plurality of misting heads secured to said bases and communicating with said manifold for producing spray mists directed outwardly across said grille.

2. The misting fan according to claim 1, wherein:
    said misting heads further direct the spray mists forwardly of said grille.

3. The misting fan according to claim 2, wherein:
    said grille includes a plurality of forwardly projecting fins radially extending from said hub.

4. The misting fan according to claim 2, wherein:
    said heads are angularly disposed with respect to the direction of the airstream through said grille resulting from said fan when operating.

5. The misting fan according to claim 4, wherein:
    the angular disposition of said heads is approximately 45° with respect to the direction of the airstream.

6. The misting fan according to claim 2, wherein:
    said housing includes an inlet for supplying the liquid to said manifold.

7. The misting fan according to claim 2, further including:
    a tube having one end connected to said housing and communicating with said manifold, said tube having another end adapted for receiving the pressurized liquid.

8. The misting fan according to claim 2, wherein:
    said housing is substantially circular about a central axis; and
    said misting heads are spaced about said central axis with their longitudinal axes at an acute angle to said central axis.

9. The misting fan according to claim 8, wherein:
    said manifold comprises a substantially circular channel concentric about said central axis.

10. The misting fan according to claim 9, wherein:

said channel of said manifold has a triangular cross-section.

11. The misting fan according to claim 9, wherein:

said channel of said manifold has a right triangular cross-section, said misting heads communicating with said channel through a hypotenuse of said right triangular cross-section.

12. The misting fan according to claim 11, wherein:

said right triangular cross-section of said manifold includes two substantially equal acute angles.

13. The misting device according to claim 11, wherein:

said housing includes a body portion and a cover portion, said body portion including said channel with said hypotenuse forming one side of said right triangular cross-section, said cover portion forming another side of said right triangular cross-section, said cover portion secured to said body portion for completing said manifold.

14. A misting device for converting a pressurized liquid into spray mists, comprising in combination:

a housing including a plurality of spaced misting head bases;

a manifold for the pressurized liquid in said housing including an inlet for the liquid;

a plurality of misting heads secured to said bases and communicating with said manifold for producing the spray mists, said misting heads arranged along the outside of said housing for directing the produced spray mists laterally outward of said housing.

15. The misting device according to claim 14, wherein:

said misting heads are further arranged for directing the produced spray mists forwardly of said housing.

16. The misting device according to claim 15, further including:

a fan supported with respect to said misting device for entraining spray mists produced by said misting device into an airstream produced by said fan.

17. The misting device and fan according to claim 16, further including:

a fan shroud secured to said fan and including a grille forwardly of said fan for permitting the airstream therethough, said grille including a hub and a plurality of forwardly projecting fins radially extending from said hub.

18. The misting device according to claim 15, wherein:

said housing is substantially circular about a central axis; and said misting heads are spaced about said central axis with their longitudinal axes at an acute angle to said central axis.

19. The misting device according to claim 18, wherein:

said manifold comprises a substantially circular channel concentric about said central axis.

20. The misting device according to claim 19, wherein:

said channel of said manifold has a triangular cross-section.

21. The misting device according to claim 19, wherein:

said channel of said manifold has a right triangular cross-section, said misting heads communicating with said channel through a hypotenuse of said right triangular cross-section.

22. The misting device according to claim 21, wherein:

said right triangular cross-section of said manifold includes two substantially equal acute angles.

23. The misting device according to claim 21, wherein:

said housing includes a body portion and a cover portion, said body portion including said channel with said hypotenuse forming one side of said right triangular cross-section, said cover portion secured to said body portion and completing said manifold with said cover portion forming another side of said right triangular cross-section.

24. A misting device for converting a pressurized liquid into spray mists, comprising in combination:

a substantially circular housing having a central axis;

a manifold for the pressurized liquid in said housing including an inlet for the liquid;

a plurality of misting heads;

a plurality of misting head bases spaced along said housing and about said central axis, at least some of said bases adapted for said misting heads to be secured thereto, along the outside of said housing said misting heads when so secured communicating with said manifold for producing the spray mists along longitudinal axes laterally outward of said housing.

25. The misting device according to claim 24, wherein:

said misting heads when so secured further direct the produced spray mists forwardly of said housing.

26. The misting device according to claim 25, further including:

a fan supported with respect to said misting device for entraining the spray mists produced by said misting heads when so secured in an airstream produced by said fan.

27. The misting device and fan according to claim 26, further including:

a fan shroud secured to said fan and including a grille forwardly of said fan for permitting the airstream therethrough, said grille including a hub and a plurality of forwardly projecting fins radially extending from said hub.

28. The misting device according to claim 24, wherein:

said misting head bases are equally spaced along said housing.

29. The misting device according to claim 24, wherein:

said manifold comprises a substantially circular channel concentric about said central axis.

30. The misting device according to claim 29, wherein:

said channel of said manifold has a right triangular cross-section, said misting heads communicating with said channel through a hypotenuse of said right triangular cross-section.

31. The misting device according to claim 24, wherein:

said channel of said manifold has a triangular cross-section.

32. The misting device according to claim 31, wherein:

said right triangular cross-section of said manifold includes two substantially equal acute angles.

33. The misting device according to claim 32, wherein:

said housing includes a body portion and a cover portion, said body portion including said channel with said hypotenuse forming one side of said right triangular cross-section, said cover portion secured to said body portion and completing said manifold with said cover portion forming another side of said right triangular cross-section.

34. A misting fan comprising the combination of:

a fan including a motor and a plurality of fan blades radially extending from said motor;

a fan shroud supported with respect to said motor, said shroud including a grille forwardly of said fan blades for permitting an airstream therethrough resulting from said fan when operating, said grille further including a hub forwardly of said motor; and a misting device including a housing secured to said hub and substantially circular about a central axis, a plurality of misting heads secured to said housing and spaced about said central axis with their longitudinal axes at an acute angle to said central axis for directing spray mists across and forwardly of said grille, a manifold in said housing communicating with said heads for distributing liquid under pressure to said heads, said manifold comprising a substantially circular channel concentric about said central axis and having a triangular cross section.

35. The misting fan according to claim 34, wherein:

said channel of said manifold has a right triangular cross-section, said misting heads communicating with said channel through a hypotenuse of said right triangular cross-section.

36. The misting fan according to claim 35, wherein:

said right triangular cross-section of said manifold includes two substantially equal acute angles.

37. The misting device according to claim 35, wherein:

said housing includes a body portion and a cover portion, said body portion including said channel with said hypotenuse forming one side of said right triangular cross-section, said cover portion forming another side of said right triangular cross-section, said cover portion secured to said body portion for completing said manifold.

38. A misting device for converting a pressurized liquid into spray mists, comprising in combination:

a substantially circular housing having a central axis;

a manifold for the pressurized liquid in said housing including an inlet for the liquid, said manifold comprising a substantially circular channel concentric about said central axis, said channel having a triangular cross-section;

a plurality of misting heads secured to said housing and spaced about said central axis with their longitudinal axes at an acute angle to said central axis, said heads communicating with said manifold for producing the spray mists and directing the produced spray mists laterally of and forwardly of said housing.

39. The misting device according to claim 38, wherein:

said channel of said manifold has a right triangular cross-section, said misting heads communicating with said channel through a hypotenuse of said right triangular cross-section.

40. The misting device according to claim 39, wherein:

said right triangular cross-section of said manifold includes two substantially equal acute angles.

41. The misting device according to claim 39, wherein:

said housing includes a body portion and a cover portion, said body portion including said channel with said hypotenuse forming one side of said right triangular cross-section, said cover portion secured to said body portion and completing said manifold with said cover portion forming another side of said right triangular cross-section.

* * * * *

UNITED STATES PATENT AND TRADEMARK OFFICE
CERTIFICATE OF CORRECTION

PATENT NO. : 6,257,502 B1
DATED : July 10, 2001
INVENTOR(S) : Barry N. Hanish, Michael Scott Davis, and Ken Bradley Dallara It is certified that error appears in the above-identified patent and that said Letters Patent is hereby corrected as shown below:

Title page,
References Cited section, the following U.S. PATENT DOCUMENTS should be added:

| | | |
|---|---|---|
| --1,884,534 | 10/1932 | Betz |
| 2,220,082 | 11/1940 | Daugherty |
| 2,238,120 | 4/1941 | Launder |
| 2,736,605 | 2/1956 | Spreng |
| 2,828,158 | 3/1958 | Patterson |
| 4,839,106 | 6/1989 | Steiner |
| 5,220,804 | 6/1993 | Tilton et al. |
| 5,338,495 | 8/1994 | Steiner et al. |
| 5,497,633 | 3/1996 | Jones et al. |
| 5,598,719 | 2/1997 | Jones et al. |
| 5,613,371 | 3/1997 | Nelson |
| 5,620,633 | 4/1997 | Junkel et al. -- |

References Cited section, the following subsection should be added:

-- OTHER PUBLICATIONS
"Mist & Cool Catalog of Outdoor Cooling Products" (1997)
Brochure, "Defeat the Heat!", Cloudburst Misting Systems (March 1999) --

Column 3,
Line 50, a comma should be inserted after "11".

Column 4,
Line 35, "cross-section, preferably" should be -- cross-section. Preferably --.

UNITED STATES PATENT AND TRADEMARK OFFICE
CERTIFICATE OF CORRECTION

PATENT NO. : 6,257,502 B1
DATED : July 10, 2001
INVENTOR(S) : Barry N. Hanish, Michael Scott Davis, and Ken Bradley Dallara It is certified that error appears in the above-identified patent and that said Letters Patent is hereby corrected as shown below:

Column 8,
Line 19, the comma should be deleted after "thereto", and a comma should be inserted after "housing".

Signed and Sealed this

First Day of January, 2002

*Attest:*

JAMES E. ROGAN
*Attesting Officer*  *Director of the United States Patent and Trademark Office*